United States Patent [19]

Lain

[11] Patent Number: 5,179,447
[45] Date of Patent: Jan. 12, 1993

[54] PERSONAL VIDEO PLAYER AND MONITOR ASSEMBLY FOR AIRLINE PASSENGER SEAT CONSOLE

[75] Inventor: Lani R. Lain, Pasadena, Calif.

[73] Assignee: Hughes-Avicom International, Inc., Glendora, Calif.

[21] Appl. No.: 847,423

[22] Filed: Mar. 5, 1992

Related U.S. Application Data

[63] Continuation of Ser. No. 686,076, Apr. 16, 1991, abandoned.

[51] Int. Cl.⁵ ............ A47C 7/72; H04N 5/655; H05K 11/02; B60R 11/02
[52] U.S. Cl. .................... 358/254; 248/917; 297/194; 312/7.2; 358/248
[58] Field of Search ............ 358/400, 254, 248, 249; 297/188, 191, 194, 217; 312/7.2; D6/335, 356; D12/195; D14/103, 113, 126, 132

[56] References Cited

U.S. PATENT DOCUMENTS

| | | | |
|---|---|---|---|
| 4,584,603 | 4/1986 | Harrison | 358/254 |
| 4,647,980 | 3/1987 | Steventon et al. | 358/245 |
| 4,843,477 | 6/1989 | Mizutani et al. | 358/254 |
| 4,866,515 | 9/1989 | Tagawa et al. | 358/254 |
| 4,915,450 | 4/1990 | Cooper | 297/188 |
| 4,982,996 | 1/1991 | Vottero-Fin et al. | 297/194 |
| 5,000,511 | 3/1991 | Shichijo et al. | 297/191 |

FOREIGN PATENT DOCUMENTS

| | | | |
|---|---|---|---|
| 54-105499 | 7/1979 | Japan . | |
| 0199369 | 12/1982 | Japan | 358/86 |
| 0069640 | 4/1985 | Japan | 248/917 |
| 63-15676 | 2/1988 | Japan . | |
| 63-128844 | 8/1988 | Japan . | |
| 63-128845 | 8/1988 | Japan . | |

Primary Examiner—Edward L. Coles, Sr.
Assistant Examiner—J. Jackson
Attorney, Agent, or Firm—Terje Gudmestad; Wanda K. Denson-Low

[57] ABSTRACT

A video player module (16) is detachably mounted in a housing (12a) of an airline passenger seat console (12), and has a cavity (16c) which opens in the forwardly facing direction (14) of the seat (10). A video monitor (22) is pivotally attached to the end of an arm (26) which extends from the console (12), and is movable between a viewing position above the console (12) and a stowed position inside the cavity (16c). The monitor (22) is positively prevented for moving rearwardly past the viewing position and possibly striking a passenger sitting in the seat (10) in response to inertial forces resulting from abrupt motion of the aircraft. The arm (26) is pivotally attached to the console (12) by a durable disc clutch (34) which is capable of securely holding the arm (26) and monitor (22) in the viewing position, and allowing the arm (26) and monitor (22) to be moved between the viewing and stowed positions against a constant and optimal value of resisting torque.

15 Claims, 7 Drawing Sheets

PERSONAL VIDEO PLAYER AND MONITOR ASSEMBLY FOR AIRLINE PASSENGER SEAT CONSOLE

This is a continuation of application Ser. No. 686,076, filed Apr. 16, 1991, now abandoned.

BACKGROUND OF THE INVENTION

1. Field of the Invention

The present invention relates to a personal video player including a monitor which is capable of being stowed in and deployed from an airline passenger seat console.

2. Description of the Related Art

Commercial airline companies are constantly striving to provide improved services for their customers. Inflight movies projected on a screen which is visible to all of the passengers in a particular section of an aircraft cabin are standard in the industry. However, the movies to be shown on each flight are selected by the airline company, and may not appeal to all of the passengers.

It is therefore desirable to provide each passenger with an individual means for viewing a movie of his or her choice. This capability is made possible by the development of video cassette recorders small enough such that one can be provided for each passenger seat. The passengers may select the movies they wish to watch from a collection of video tapes provided in the aircraft.

Various configurations of personal video players have been proposed as illustrated in a advertisement by the Airvision company in Avion magazine, 4th quarter 1990, page 37. These include viewing monitors mounted in seatbacks, and on trays which fold down from the seatbacks. For front row seats with no seatbacks in front of them, the monitors may be rigidly mounted on the armrests or consoles between the seats. Monitors may also be attached to the ends of telescoping arms which extend upwardly from consoles or armrests.

These prior art video player arrangements are subject to various drawbacks. Modification or replacement of airline seats to accommodate video monitors therein can be prohibitively expensive. Monitors which attach to seatback trays are subject to breakage and theft. Monitors which are immovably attached to arms extending from seat armrests or consoles are also easily broken and may constitute substantial safety hazards in the event of turbulent aircraft motion, since passengers may be jolted forward from their seats and strike their heads against the protruding monitors. Telescopic arms for supporting video monitors lack the durability for practical use.

SUMMARY OF THE INVENTION

In accordance with the present invention, a video player module is detachably mounted in a housing of an airline passenger seat console, and has a cavity which opens in the forwardly facing direction of the seat. A video monitor is pivotally attached to the end of an arm which extends from the console, and is movable between a viewing position above the console and a stowed position inside the cavity. The arm is pivotally attached to the console by a durable clutch which is capable of securely holding the arm and monitor in the viewing position, and allowing the arm and monitor to be moved between the viewing and stowed positions against a constant and optimal value of resisting torque.

The present personal video player assembly is specifically designed to overcome the drawbacks and avoid the safety hazards described above with reference to the related art. The monitor is positively prevented from moving rearwardly past the viewing position and possibly striking a passenger sitting in a seat in response to inertial forces resulting from abrupt motion of the aircraft. Inertial forces which urge a passenger forwardly out of his or her seat also urge the monitor forwardly and downwardly so that the passenger's head will not strike the monitor. The monitor is securely stowable inside the cavity of the console for take-offs, landings, and turbulent flight conditions.

The clutch which pivotally connects the monitor arm to the console is preferably a multiple disc clutch which includes a housing connected to an end portion of the arm and has a bore formed therethrough which extends perpendicular to the longitudinal axis of the arm. A shaft is supported by the console and is rotatably received in the bore. A plurality of first clutch discs have central holes through which the shaft fittingly extends, and are keyed to the shaft. A plurality of second clutch disks have central holes through which the shaft fittingly extends, are keyed to the housing, and alternate with the first clutch discs along the shaft. A plurality of compression springs press the first and second clutch discs together such that the disc clutch provides an optimal resisting torque to movement of the arm and monitor.

Although the present video assembly may be embodied using another type of clutch such as a cone clutch to pivotally connect the arm to the console, the multiple disc clutch provides higher resisting torque with lower stresses on the friction surfaces thereof. Although disc clutches are known in the art per se, incorporation of a disc clutch into the present configuration provides a deployment arrangement which is more reliable, less sensitive to manufacturing tolerances, and more consistent over its operating lifetime than if other types of clutches were used. The resisting torque may be easily changed by altering the number of discs, or selecting compression springs with different spring constants.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
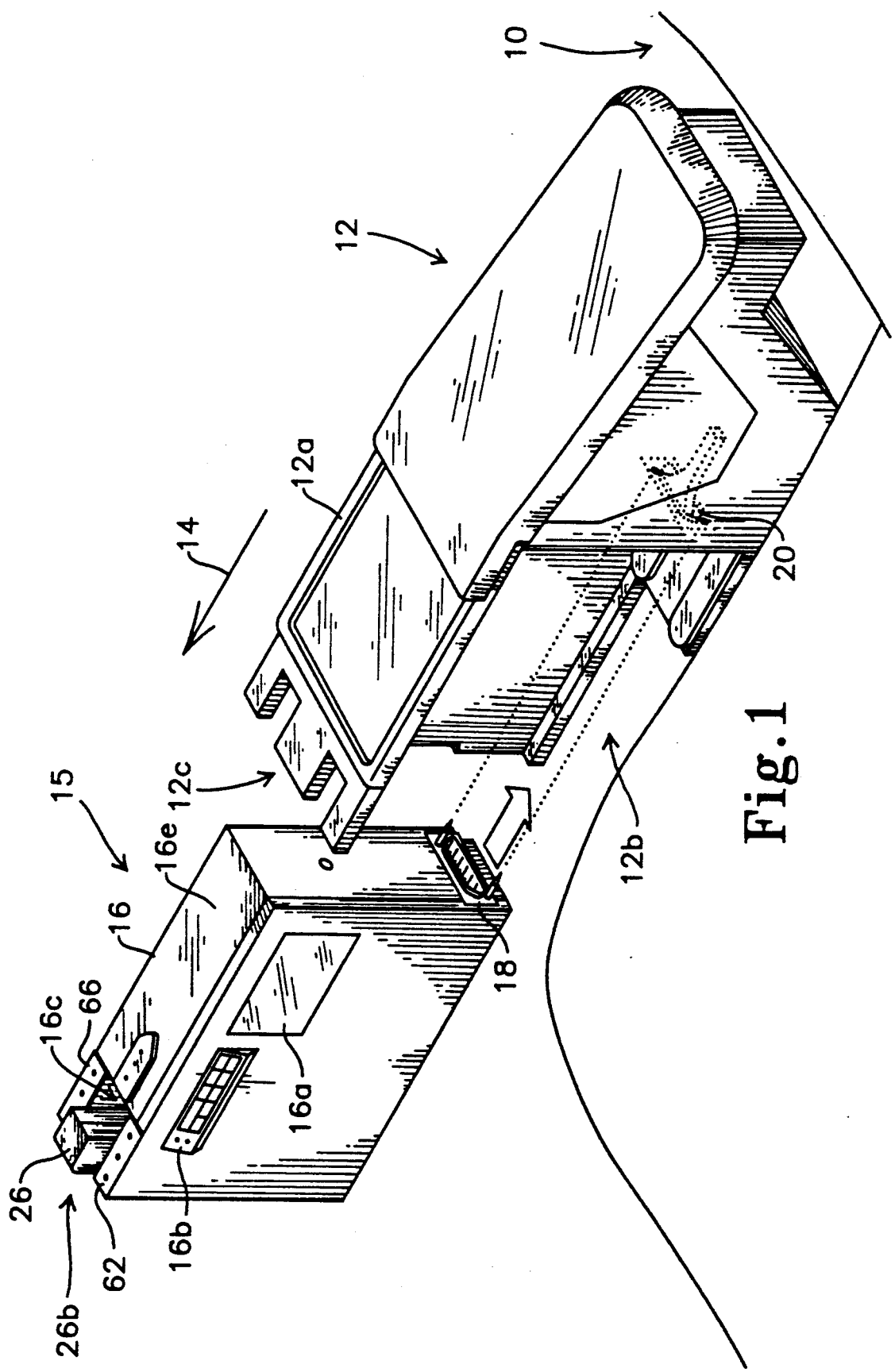
FIG. 1 is a perspective view illustrating an airline seat console incorporating a personal video player and monitor ass embodying the present invention.
Figure 2:
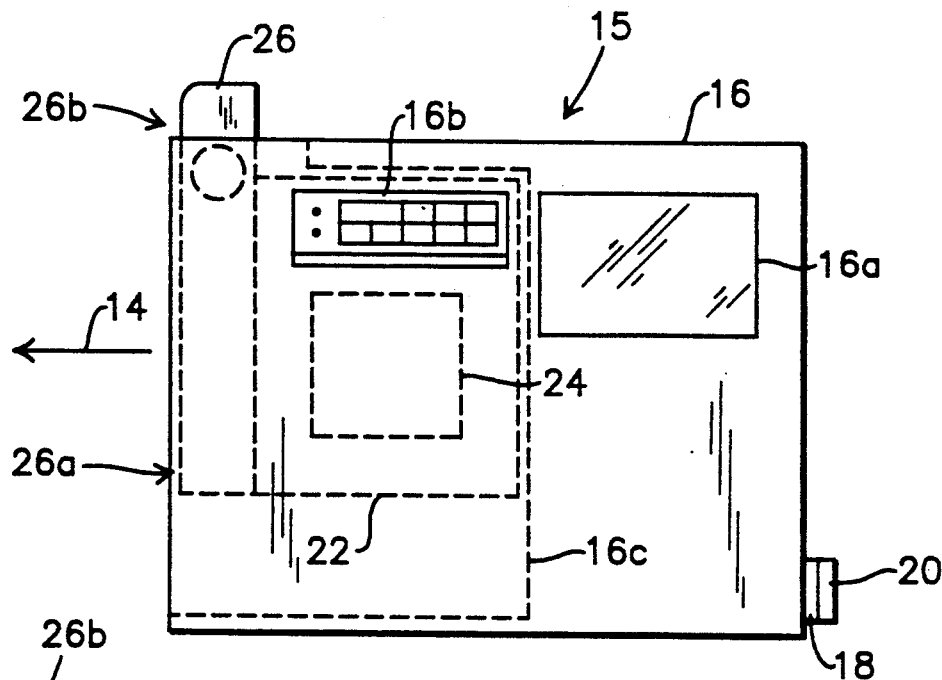
FIG. 2 is a side elevation of the video assembly.
Figure 3:
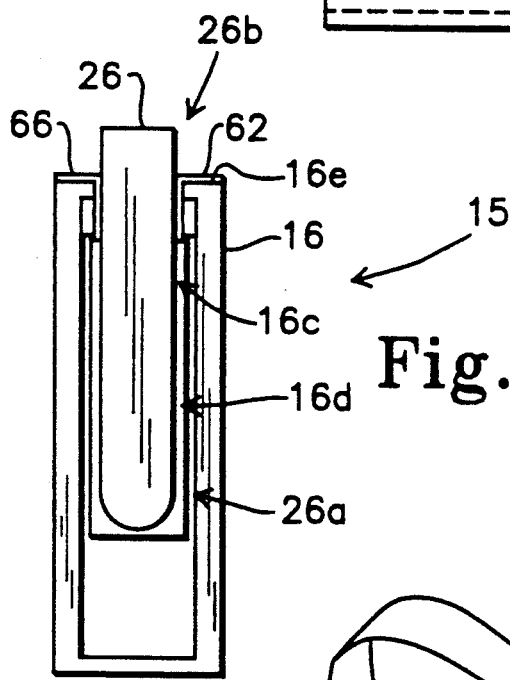
FIG. 3 is a front elevation of the video assembly.

Referring to FIGS. 1 to 3 of the drawing, a passenger seat 10 for a commercial aircraft has a console 12 mounted adjacent thereto. The console 12 may constitute an armrest, or may be provided as a separate unit between armrests (not shown) of adjacent seats.

The console 12 includes a housing 12a provided with a cavity 12b having an opening 12c in a forwardly facing direction (indicated by an arrow 14) of the seat 10. In a preferred embodiment of the invention, a personal video player assembly 15 includes a player module 16 adapted to be detachably received in the cavity 12b through the opening 12c. The module 16 is provided with an electrical connector 18 which mates with a conjugate connector 20 at the inner end of the cavity 12b when the module 16 is fully inserted in the housing 12a.

In the illustrated embodiment, the module 16 constitutes part of the console 12 when inserted therein. Providing the video player in modular detachable form facilitates servicing thereof. The module 16 is not intended to be detached from the housing 12 by the airline passengers. It is further within the scope of the invention, although not specifically illustrated, to provide the video player as a permanently mounted assembly inside the housing 12a. The module 16 includes a door 16a which may be opened to receive a video cassette to be played, a plurality of buttons 16b for control of the playing operation, and an internal mechanism for playing the cassette and generating electrical signals representing the visual images recorded thereon. The internal player mechanism is not the subject matter of the present invention and is not illustrated in the drawings. The console 12 is further provided with a headphone jack (not shown) in which a set of headphones may be plugged to reproduce the sounds recorded on the video cassette.

The present personal video assembly 15 further includes a video display monitor 22 having a liquid crystal display (LCD) or other type of screen 24 for displaying the visual images corresponding to the electrical signals generated by the player module 16. The monitor 22 is illustrated in FIGS. 1 to 3 in a stowed position inside a cavity 16c of the module 16, and is pivotally connected to a first end portion 26a of an arm 26. An opposite or second end portion 26b of the arm 26 is pivotally connected to the module 16 at the upper end of an opening 16d of the cavity 16c in the forwardly facing direction 14 of the seat 10.

The monitor 22 and arm 26 are securely stowed inside the module 16 and thereby inside the console 12 for takeoffs, landings, turbulent flight, or when it is not desired to use the player assembly 15. Although not shown, a latch is preferably provided to securely lock the monitor 22 and arm 26 inside the module 16 in the stowed position. The monitor 22 is deployed from the stowed position to a viewing position for use of the assembly 15 as illustrated in FIGS. 4a to 4d.

Figure 4A:
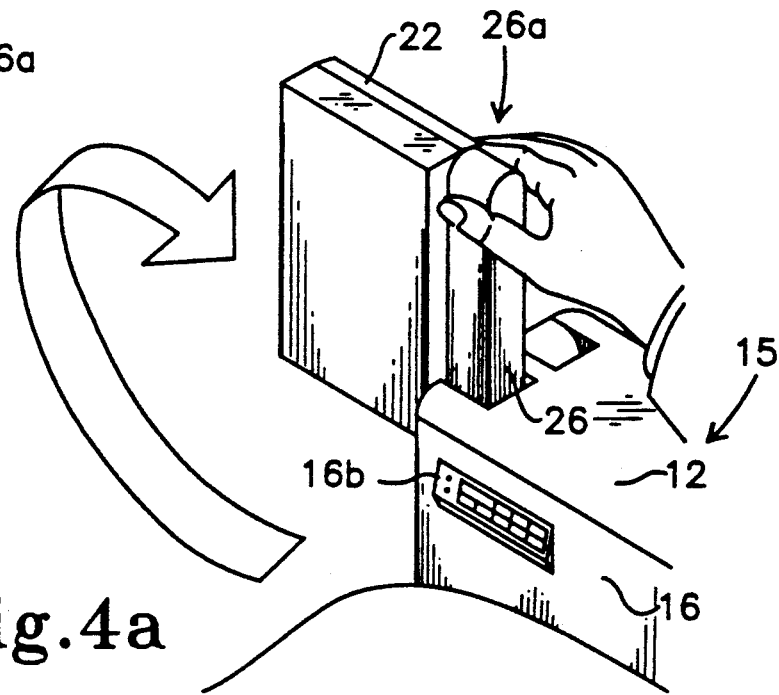
FIGS. 4a to 4d are perspective views illustrating the deployment of a display monitor of the video assembly.

In FIG. 4a, the passenger grasps the first end portion 26a of the arm 26 (which is the lower end portion of the arm 26 in the stowed position), and pulls the arm 26 and thereby the monitor 22 forwardly (in the direction of the arrow 14) and then upwardly so that the arm 26 and monitor 22 are rotated or pivoted by approximately 180°. The arm 26 pivots about the connection at the second end portion 26b thereof to enable this operation to be performed.

Figure 4B:
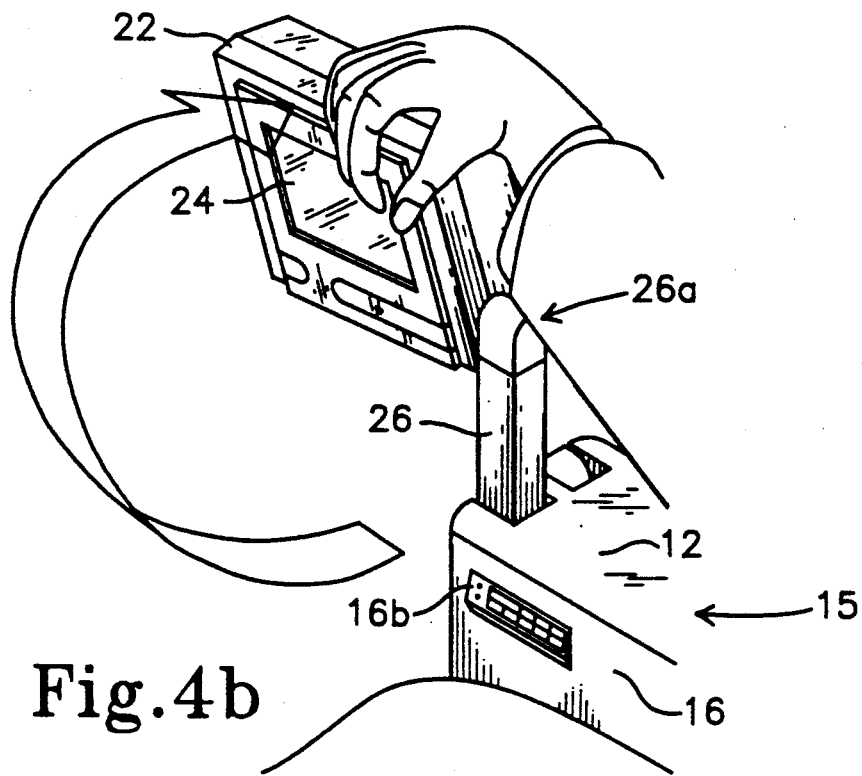
Figures 4C, 4D:
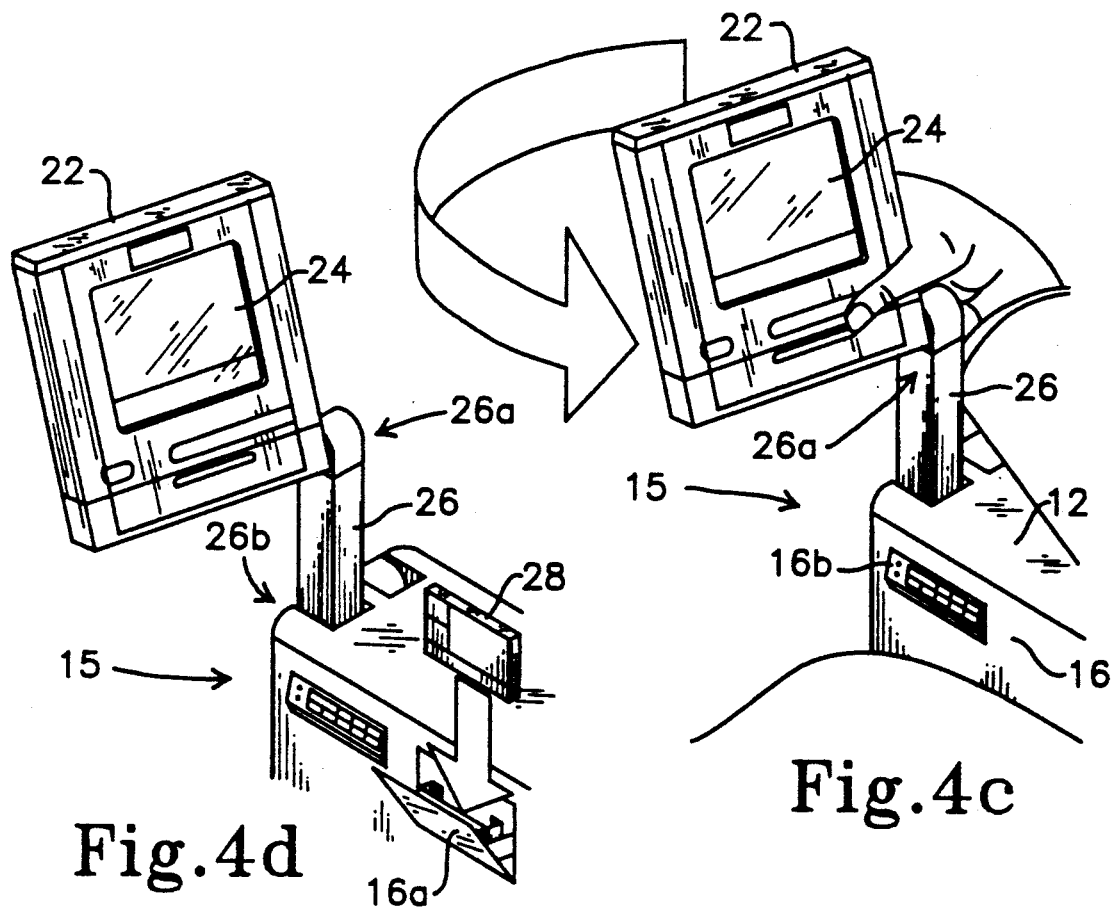

As viewed in FIG. 4b, the monitor 22 is then pivoted clockwise by approximately 180° about the connection at the first end portion 26a of the arm 26. As viewed in FIG. 4c, the monitor 22 is then pivoted rearwardly (opposite to the direction of the arrow 14) by approximately 90° into a viewing position as shown in which the screen 24 of the monitor 22 is comfortably viewable by a passenger sitting in the seat 10. As illustrated in FIG. 4d, the door 16a of the player module 16 is opened, a video cassette 28 is inserted therein, the door 16a is closed to move the cassette 28 into a playing position inside the module 16, and the buttons 16b are pressed as desired to control the playing of the cassette 28.

The monitor 22 and arm 26 are moved from the viewing position illustrated in FIGS. 4c and 4d to the stowed position illustrated in FIGS. 1 to 3 by reversing the steps illustrated in FIGS. 4a to 4c.

Figure 5:
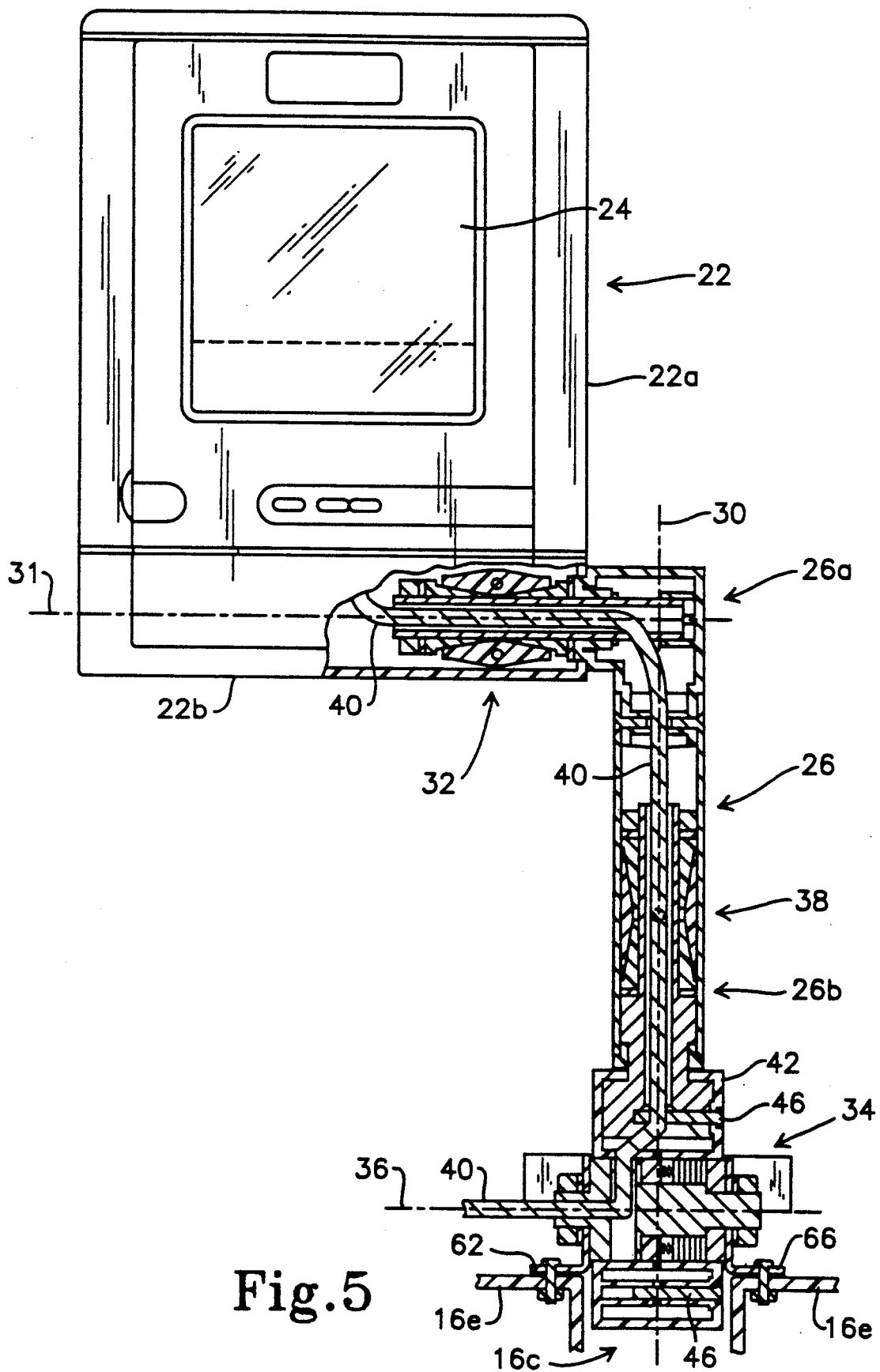
FIG. 5 is a rear elevation, partly in section, illustrating the monitor in a viewing position.

Referring to FIG. 5, the arm 26 is preferably straight, and has a longitudinal axis 30. In an alternative configuration (not shown) in which the arm 26 is not straight, the longitudinal axis is defined as passing through the centers of the pivotal connections of the end portions 26a and 26b. The monitor 22 is pivotal about an axis 31 at the first end portion 26a of the arm 26 which is perpendicular to the axis 30. More specifically, the first end portion 26a of the arm 26 is pivotally connected by a first joint assembly 32 to a side 22a of the monitor 22 which extends parallel to the arm 26 and thereby the axis 30. The joint assembly 32 is illustrated as being provided adjacent to a bottom 22b of the monitor 22 which extends parallel to the axis 31, although the connection thereof may be made at other locations within the scope of the invention.

The second end portion 26b of the arm 26 is pivotally connected to an upper wall 16e of the module 16 by a second joint assembly 34 so as to be pivotal about an axis 36 which is perpendicular to the axis 30. The axis 36 is oriented horizontally when the module 16 is inserted in the console 12, such that the axis 36 is also perpendicular to the forwardly facing direction 14 of the seat 10.

The second joint assembly 34 is connected to the second end portion 26b of the arm 26 by a third joint assembly 38 which enables the arm 26 to pivot about the axis 30. The three joint assemblies 32, 34 and 38 enable the monitor 22 and arm 26 to be movable with three degrees of freedom as required to move the monitor 22 between the stowed position of FIGS. 1 to 3 and the viewing position of FIGS. 4c and 4d. It will be noted in FIG. 4a that the monitor 22 is aligned with the arm 26 in the forwardly facing direction 14 so that it can be moved into and out of the cavity 16c of the module 16 through the opening 16d thereof. The internal player mechanism in the module 16 is connected to the monitor 22 by a cable 40 which passes through the arm 26 and joint assemblies 32, 34 and 38.

Figure 6:
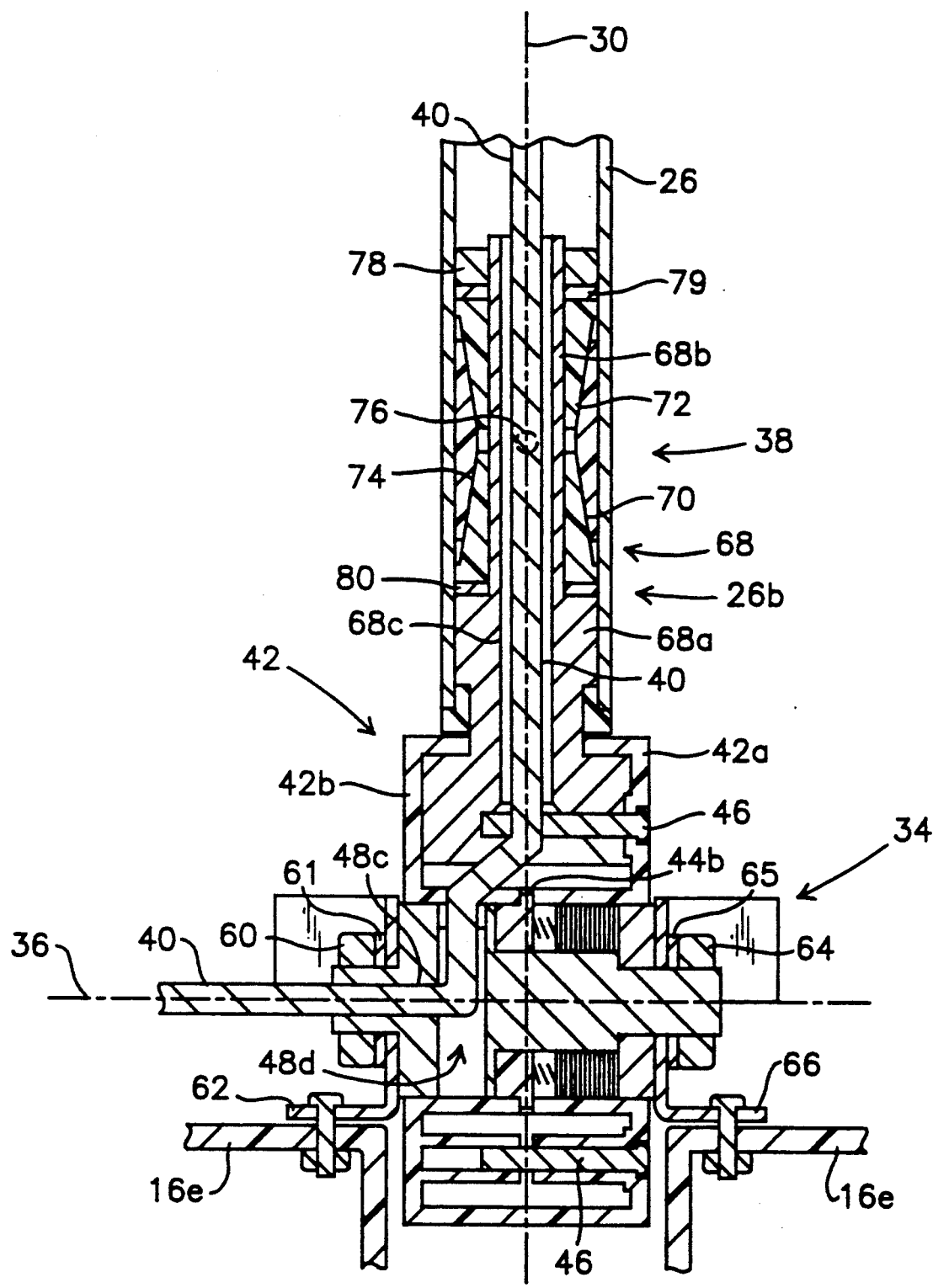
FIG. 6 is a fragmentary rear elevation, partly in section, illustrating a joint for connecting a supporting arm of the assembly to the console in enlarged scale.
Figure 7:
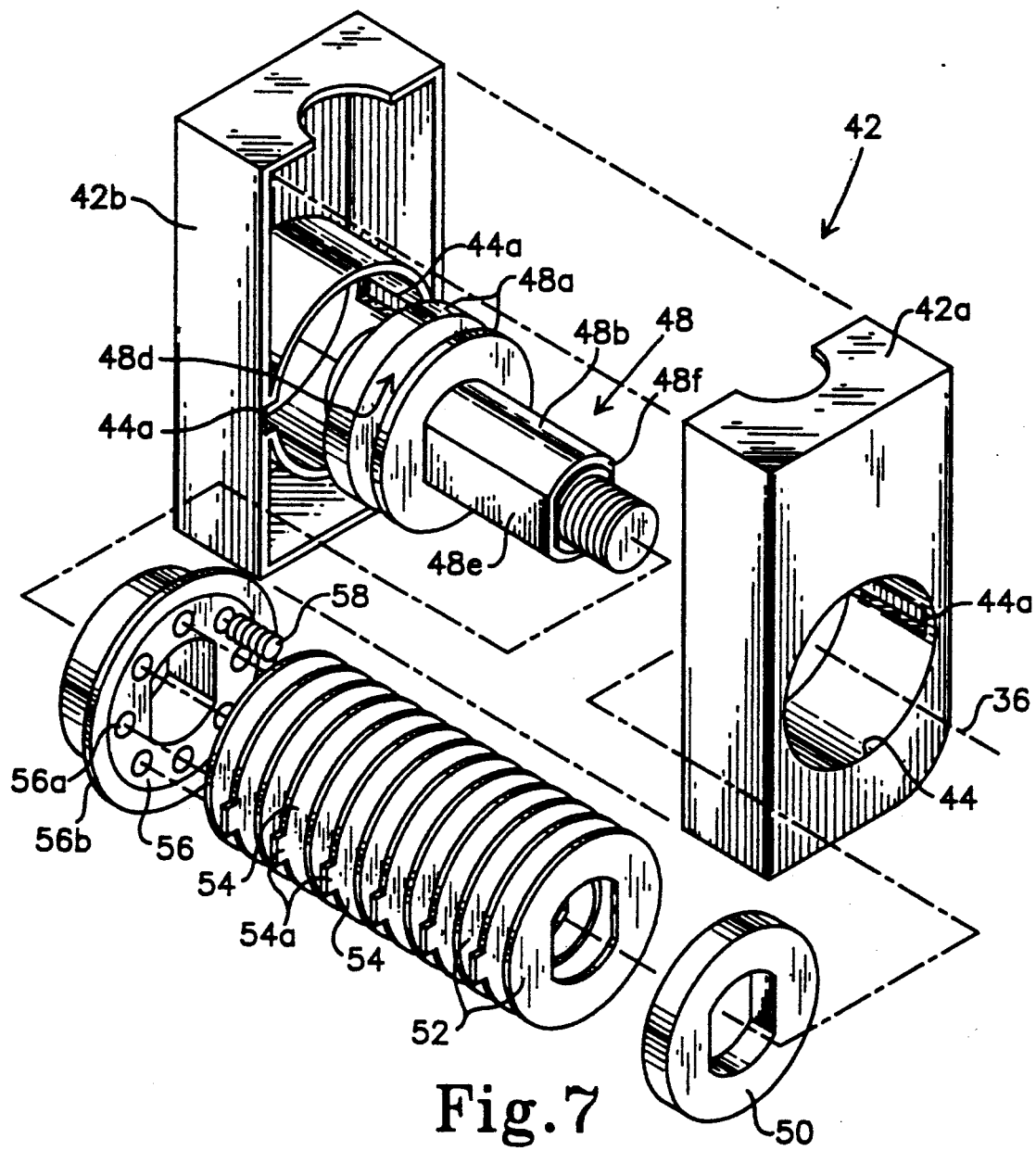
FIG. 7 is an exploded view of the joint illustrated in FIG. 6.

With reference further being made to FIGS. 6 and 7, the second joint assembly 34 includes a housing 42 having two mating halves 42a and 42b which are held together with bolts 46 formed with a transverse circular bore 44. The axis 36 passes through the center of the bore 44. A shaft 48 has a large diameter portion which constitutes a journal 48a and is rotatably fitted in the bore 44, and a small diameter portion 48b. The journal 48a is formed with a longitudinal hole 48c which communicates with a radial cutout 48d such that the cable 40 may extend rightwardly through the hole 48c and upwardly through the cutout 48d as viewed in the drawing. The cutout 48d is made large enough such that the body of the journal 48a will not interfere with the run of the cable 40 through an angular range in excess of approximately 180°.

The small diameter portion 48b of the shaft 48 is integral with the journal 48a thereof, and is milled down to form two diametrically opposed, longitudinally extending flat surfaces 48e. The thickness of the portion 48b of the shaft 48 between the surfaces 48e is smaller than the diameter of the portion 48b in the areas thereof which are not milled down. A movable journal 50 is slidingly fitted on the small diameter portion 48b of the shaft 48, has an inner cross section conjugate to the outer cross section of the portion 48b, and has an outer diameter equal to that of the journal 48a. The journal 50 is thereby keyed onto the portion 48b, being longitudinally or axially slidable on the portion 48b, but rotatable integrally therewith. The journal 50 rotatably fits in the bore 44 of the housing 42 to rotatably support the shaft 48 therein in combination with the journal 48a.

Figure 8:
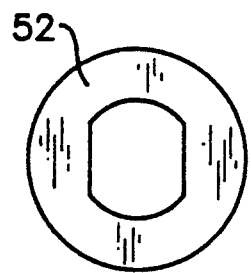
FIG. 8 is a plan view of a first type of clutch disc of the joint illustrated in FIGS. 6 and 7.
Figure 9:
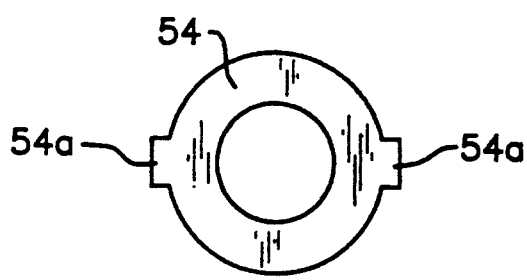
FIG. 9 is a plan view of a second type of clutch disc of the joint illustrated in FIGS. 6 and 7.

A plurality of first clutch discs 52 which are further illustrated in FIG. 8 are slidingly fitted on the portion 48b of the shaft 48. The discs 52 have the same cross section as the journal 50 and are thereby keyed to the portion 48b of the shaft 48 for integral rotation therewith. A plurality of second clutch discs 54 are also slidingly fitted on the portion 48b of the shaft 48, and have circular central holes with a diameter substantially equal to that of the areas of the portion 48b which are not milled down. The clutch discs 54 are thereby rotatable on the portion 48b as well as being axially slidable thereon. The clutch discs 52 and 54 alternate with each other along the portion 48b of the shaft 48.

The bore 44 of the housing 42 is formed with two diametrically opposed longitudinal slots 44a. The clutch discs 54 are formed with two diametrically opposed, radially extending lugs 54a which are conjugate to and slidingly fit into the slots 44a. The clutch discs 54 are thereby keyed to the housing 42 by means of the slots 44a and lugs 54a and integrally rotatable therewith.

A spring retainer 56 is securely fastened to the end of the journal 48a which faces the journal 50, or may be integral with the journal 48a (not illustrated). The retainer 56 is formed with a plurality of longitudinal holes 56a which are angularly spaced from each other about the portion 48b of the shaft 48. Compression springs 58 are retained in the holes 56a at their left ends as viewed in the drawings. The right ends of the springs 58 abut against the left ends of the assembly of alternating clutch discs 52 and 54. The springs 58 press the clutch discs 52 and 54 together against the journal 50 to create a frictional force between the pressing surfaces of the clutch discs 52 and 54.

The left end of the journal 48a is threaded, and securely attached by a nut 60 and washer 61 to a hinge bracket 62 which is turn is securely fastened to the upper wall 16e of the module 16. The journal 48a is fixed to the bracket 62 by screws or the like (not shown) to prevent rotation of the journal 48a. The right end of the small diameter portion 48b of the shaft 48 is also threaded, and securely attached by a nut 64 and washer 65 to another hinge bracket 66 with is also securely fastened to the wall 16e. The portion 48b of the shaft 48 is keyed to the bracket 66 to prevent rotation thereof. The shaft 48 is thereby rigidly supported on the upper wall 16e of the module 16 by the brackets 62 and 66.

Rotation or pivotal movement of the arm 26 causes the housing 42 and clutch discs 54 to pivot integrally therewith, while the shaft 48 and clutch discs 52 remain stationary. Friction between the pressing surfaces of the clutch discs 52 and 54 creates a constant resisting torque which can be adjusted to an optimal value.

The right end portion of the shaft 48 is formed with a land 48f which abuts against the left side of the bracket 66 when the nut 64 has been securely tightened. The right side of the journal 50 is pressed into abutting engagement with the left side of the bracket 66 by the compression springs 58 acting through the clutch discs 52 and 54. The periphery of the spring retainer 56 fits into a circumferential groove 44b of the bore 44 which prevents the spring retainer 56 from moving longitudinally. This creates a fixed spacing between the facing sides of the spring retainer 56 and journal 50 in which the clutch discs 52 and 54 and springs 48 are disposed.

In a preferred embodiment of the invention, the clutch discs 52 are made of an alloy of beryllium and copper and the clutch discs 54 are made of stainless steel, with seven discs 52 and six discs 54 being illustrated. Eight compression springs 58 are shown. The frictional force between the clutch discs 52 and 54 and thereby the resisting torque provided by the joint assembly 34 may be adjusted to a desired optimal value by selection of the thickness of the journal 50 (and thereby the spacing between the facing sides of the spring retainer 56 and journal 50) the numbers of clutch discs 52 and 54, the numbers of compression springs 58, and the spring constants of the springs 58. Reducing said spacing, increasing the numbers of clutch discs, increasing the number of springs, and increasing the spring constant of the springs will increasing the resisting torque, and vice-versa. The consistency of the resisting torque may be enhanced by coating the pressing surfaces of the clutch discs 52 and 54 with a teflon-based lubricant such as Flouropan-180 manufactured by the Kluber company.

As illustrated in FIG. 6, the arm 26 has a rectangular cross section, and is hollow. The third joint assembly 38 includes a cone type friction clutch disposed inside the second end portion 26b of the arm 26.

More specifically, the third joint assembly 38 includes a shaft 68 having a lower shank portion 68a which is fittingly retained inside the housing 42 and an upper portion 68b which has a cross section similar to that of the small diameter portion 48b of the shaft 48. A friction cone 70 is keyed onto the portion 48b, and has a diameter which tapers inwardly from the bottom to the top thereof as viewed in the drawing. Another friction cone 72 is keyed onto the portion 48b, and has a diameter which tapers inwardly from the top to the bottom thereof as viewed in the drawing. A body 74 is securely retained in the arm 26 by screws 76, and has a bore formed with tapers conjugate to those of the cones 70 and 72, with the cones 70 and 72 fitting into the lower and upper tapers of the bore of the body 74 respectively.

The upper end of the portion 68b of the shaft 58 is threaded. A nut 78 is screwed onto the upper end of the portion 68b, thereby urging the cone 72 downwardly through an intervening washer 79 and urging the cone 70 upwardly into the tapered bore of the body 74. A wave spring 80 is provided between the upper end of the shank 68a and the lower end of the cone 70. The cones 70 and 72 are thereby pressed into the body 74, with the mating tapered surfaces thereof being frictionally pressed together.

The body 74 rotates integrally with the arm 26, whereas the cones 70 and 72 rotate integrally with the shaft 68. The frictional resistance between the mating tapered surfaces of the cones 70 and 72 and body 74 provides a selected value of resisting torque when the arm 26 is pivoted about the shaft 68 and thereby about the axis 30. The shaft 68 is formed with a longitudinal bore or hole 68c to enable the cable 40 to extend therethrough from the module 16 to the arm 26.

Figure 10:
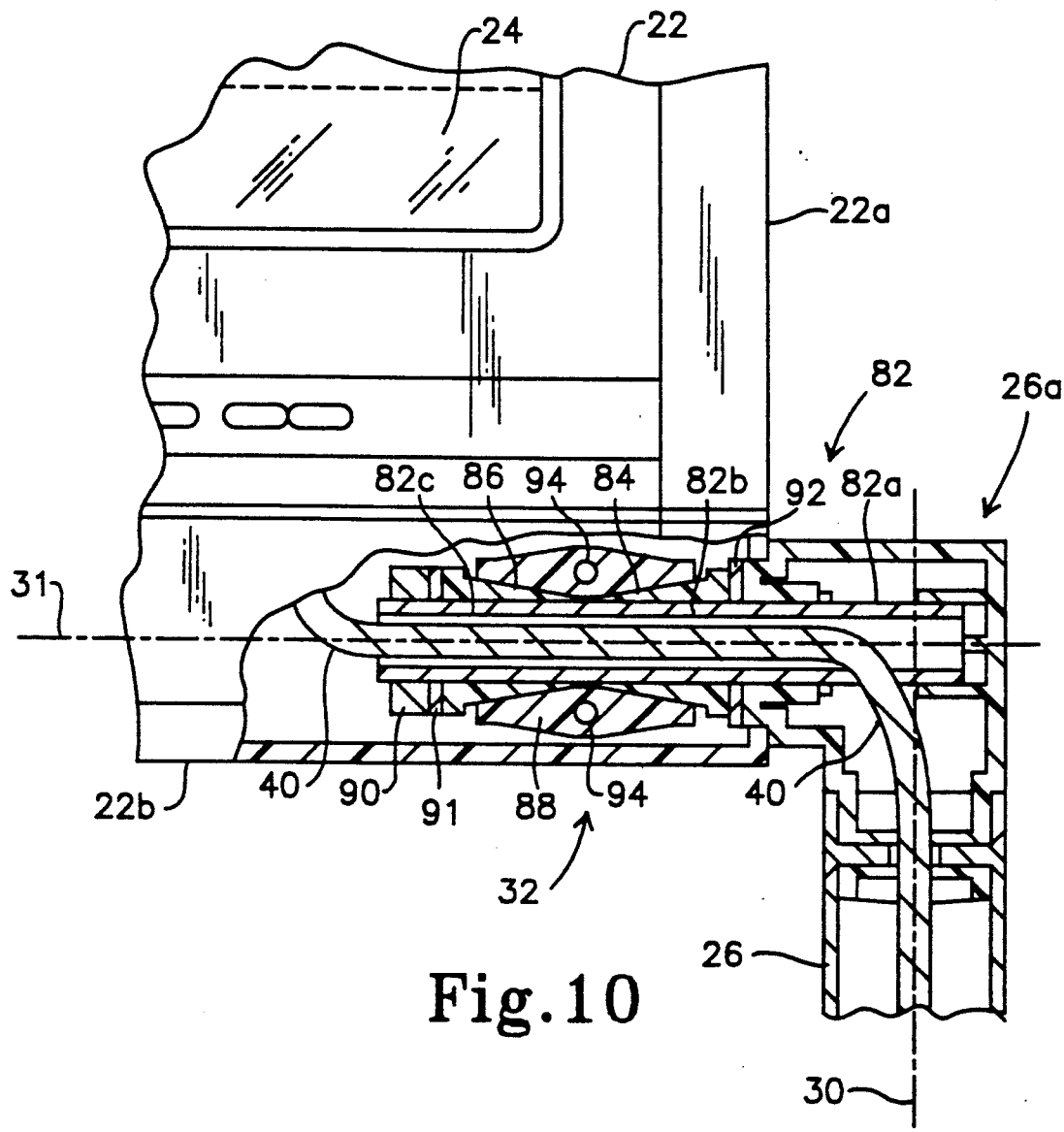
FIG. 10 is a fragmentary rear elevation, partly in section, illustrating a joint for connecting the supporting arm to the monitor in enlarged scale.

The first joint assembly 32 is illustrated in FIG. 10, and includes a cone type friction clutch which is essentially similar to that of the third joint assembly 38. A shaft 82 has a shank 82a which is fittingly retained in the first end portion 26a of the arm 26, and a portion 82b which extends leftwardly from the shank 82a as viewed in the drawing. Friction cones 84 and 86 are keyed onto the portion 82b and pressed into the right end left ends respectively of a tapered bore of a body 88 by means of a nut 90, washer 91 and wave spring 92. The body 88 is rigidly fixed inside the lower portion of the monitor 22 by screws 94. The shaft 82 and cones 84 and 86 rotate integrally with the arm 26, while the body 88 rotates integrally with the monitor 22. The pressing engagement between the tapered surfaces of the cones 84 and 86 and body 88 provide a desired value of resisting torque. A hole 82c is formed through the shaft 82 to enable the cable 40 to pass therethrough from the arm 26 to the monitor 22.

The disc clutch as described above in the second joint assembly 34 is preferable to the cone clutches in the first and third joint assemblies 32 and 38, as it is much more durable and consistent than the cone clutches. The tapered friction surfaces of the cones and conjugate bodies of the cone clutches are generally made of plastic, and are subjected to relatively high stresses which cause early failure and an undesirable "stick-slip" type of operation.

The disc clutch includes metal discs which are much more durable than the plastic cones and bodies. In addition, the multiple clutch discs provide a greatly increased total frictional surface area which enables increased resisting torque with lower internal stresses. The disc clutch may be expected to provide a constant value of resisting torque and require no maintenance over the entire operating lifetime of the video player assembly 15.

Although the disc clutches are more expensive to manufacture than the cone clutches, the assembly 15 may be further improved by replacing the cone clutches in the first and third joint assemblies 32 and 38 with disc clutches as in the second joint assembly 34. It is further within the scope of the invention, although an obviously less preferred embodiment, to replace the disc clutch in the second joint assembly 34 with a cone clutch. The scope of the invention further includes replacing any or all of the joint assemblies with an alternative type of clutch other those specifically described and illustrated.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A video assembly for a passenger seat having a forwardly facing direction comprising:
    a console mounted adjacent to the seat;
    a video display monitor;
    an arm having first and second end portions, the monitor being attached to the first end portion of the arm;
    a housing connected to the second end portion of the arm and having a bore formed therethrough with a horizontal axis which extends perpendicular to said forwardly facing direction;
    a shaft which is supported by the console and rotatably received in said bore;
    a plurality of first clutch discs having central holes through which the shaft fittingly extends, the first clutch discs being keyed to the shaft;
    a plurality of second clutch discs having central holes through which the shaft fittingly extends, the second clutch discs being keyed to the housing and alternating with the first clutch discs along the shaft; and
    spring means for pressing the first and second clutch discs together to provide said predetermined resisting torque.

2. A video assembly as in claim 1, in which: the shaft comprises:
    a small diameter portion which fittingly extends through the holes of the first and second clutch discs; and
    a large diameter portion which rotatably fits in said bore;
    the second joint means further comprises a journal which rotatably fits in said bore and has a central hole through which the small diameter portion of the shaft fittingly extends;
    the first and second clutch discs are disposed between the large diameter portion of the shaft and the journal; and
    the spring means is disposed between the large diameter portion of the shaft and the first and second clutch discs.

3. A video assembly as in claim 2, in which:
    the spring means comprises a plurality of compression springs which extend parallel to the shaft and are angularly spaced from each other about the small diameter portion of the shaft.

4. A video assembly as in claim 3, further comprising means for maintaining the journal at a predetermined position relative to the large diameter portion of the shaft such that the compression springs are compressed between the first and second clutch discs and the large diameter portion of the shaft.

5. A video assembly as in claim 4, in which the second joint means further comprises a spring retainer which is integral with the large diameter portion of the shaft and formed with holes in which the compression springs are retained.

6. A video assembly as in claim 5, in which:
    said bore is formed with a circumferential slot; and
    the spring retainer has a periphery which fits in said circumferential slot such that the spring retainer and shaft are prevented from longitudinal movement relative to the housing.

7. A video assembly as in claim 1, in which the joint means further comprises a teflon-based lubricant coated on surfaces of the first and second clutch discs which are pressed together by the spring means.

8. A personal video assembly for a passenger seat having a forwardly facing direction comprising:
a console mounted adjacent to the seat;
a video display monitor;
an arm having first and second end portions, the monitor being attached to the first end portion of the arm; and
joint means comprising a disc clutch for pivotally connecting the second end portion of the arm to the console with a predetermined resisting torque, wherein the console is provided with a cavity having an opening in the forwardly facing direction of the seat, the monitor being movable between a viewing position outside said cavity and a stowed position inside said cavity.

9. A personal video assembly for a passenger seat, comprising:
a console mounted adjacent to the seat;
a video display monitor;
an arm having a longitudinal axis and first and second end portions;
a first joint means connecting the monitor to the first end portion of the arm for allowing the monitor to pivot relative to said axis with a first predetermined resisting torque;
a second joint means connecting the second end portion of the arm to the console for allowing the arm to pivot relative to the console, said second joint comprising:
a housing connected to the second end portion of the arm and having a bore formed therethrough which extends perpendicular to said longitudinal axis;
a shaft which is supported by the console and rotatably received in said bore;
a plurality of first clutch discs having central holes through which the shaft fittingly extends, the first clutch discs being keyed to the shaft;
a plurality of second clutch discs having central holes through which the shaft fittingly extends, the second clutch discs being keyed to the housing and alternating with the first clutch discs along the shaft; and
spring means for pressing the first and second clutch discs together to provide said second predetermined resisting torque; and
a third joint means connected between the first and second joint means for allowing the monitor to pivot about said axis with a third predetermined resisting torque.

10. A video assembly as in claim 9, in which: the shaft comprises:
a small diameter portion which fittingly extends through the holes of the first and second clutch discs; and
a large diameter portion which rotatably fits in said bore;
the second joint means further comprises a journal which rotatably fits in said bore and has a central hole through which the small diameter portion of the shaft fittingly extends;
the first and second clutch discs are disposed between the large diameter portion of the shaft and the journal; and
the spring means is disposed between the large diameter portion of the shaft and the first and second clutch discs.

11. A video assembly as in claim 10, in which:
the spring means comprises a plurality of compression springs which extends parallel to the shaft and are angularly spaced from each other about the small diameter portion of the shaft.

12. A video assembly as in claim 11, further comprising means for maintaining the journal at a predetermined position relative to the large diameter portion of the shaft such that the compression springs are compressed between the first and second clutch discs and the large diameter portion of the shaft.

13. A video assembly as in claim 12, in which the second joint means further comprises a spring retainer which is integral with the large diameter portion of the shaft and formed with holes in which the compression springs are retained.

14. A video assembly as in claim 13, in which:
said bore is formed with a circumferential slot; and
the spring retainer has a periphery which fits in said circumferential slot such that the spring retainer and shaft are prevented from longitudinal movement relative to the housing.

15. A video assembly as in claim 9, in which the second joint means further comprises a teflon-based lubricant coated on surfaces of the first and second clutch discs which are pressed together by the spring means.

* * * * *